March 21, 1933.   R. S. SANFORD   1,902,585

CABLE CONTROL

Filed March 9, 1929

INVENTOR
Roy S. Sanford
BY H. O. Clayton
ATTORNEY

Patented Mar. 21, 1933

1,902,585

UNITED STATES PATENT OFFICE

ROY SELDEN SANFORD, OF SOUTH BEND, INDIANA, ASSIGNOR TO BENDIX BRAKE COMPANY, OF SOUTH BEND, INDIANA, A CORPORATION OF ILLINOIS

CABLE CONTROL

Application filed March 9, 1929. Serial No. 345,703.

This invention relates to power transmission mechanism and is illustrated as embodied in a brake control structure for an automobile vehicle.

The invention contemplates the provision of means associated with a flexible tension or power transmission element to insure a predetermined relative movement of said element with respect to its fittings or supports. More specifically the invention insures an oscillatory movement of the flexible tension element without buckling or bending at its bearings. In the preferred form of the invention the fitting supporting a conduit for the tension element is preferably extended at one end to serve as a tubular bearing for one end of a solid tension link, the flexible tension element being connected to said solid link within the fitting. With release movement of the transmission linkage a predetermined path for the flexible element is thus insured.

Various other minor features of the invention, including details of construction and combinations of parts will become apparent from the following detailed description of my preferred embodiment in which.

Figure 2:
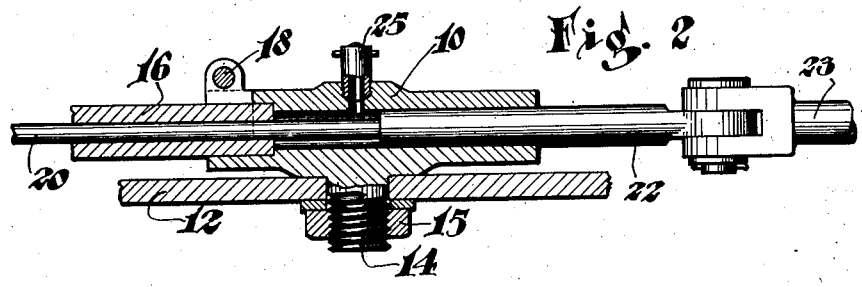
Figure 2 is a longitudinal sectional view through a conduit fitting secured to the side frame member of a vehicle chassis and disclosing my invention associated therewith.
Figure 3:
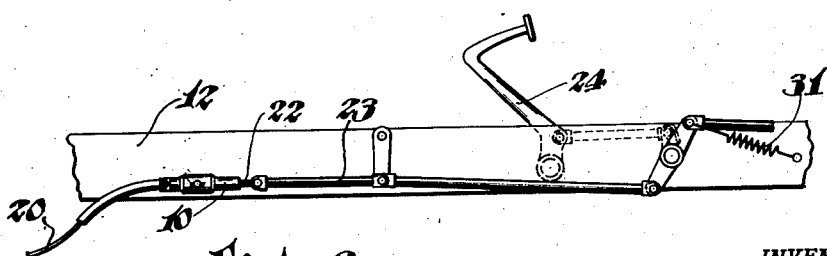
Figure 3 is a diagrammatic showing of the invention detailed in Figure 2 and disclosing the connection of the tension element with the service pedal.

In the preferred embodiment of my invention shown associated with a brake structure of an automobile there is provided, as disclosed in Figure 2, a tubular support fitting 10 of double interior diameter, which fitting may be detachably secured to an automobile chassis channel member 12 by an integral stud 14 clamped in place by a nut 15.

Telescoping within one end of the fitting I preferably provide one end of the usual flexible conduit 16 which may be secured in place by a split boss 18.

The flexible force-transmitting tension element 20 passes through the conduit 16 into the smaller bore of the fitting and is there rigidly secured to a solid tubular end piece 22 closely fitting within said bore and connected at its outer end with the rigid brake pull rod 23 leading to the service pedal 24. A lubricating fitting 25 in the support provides an intake port for grease or oil which, by virtue of the close fit of the end lug 22, must necessarily pass from the smaller bore into the conduit and around the tension element.

Figure 1:
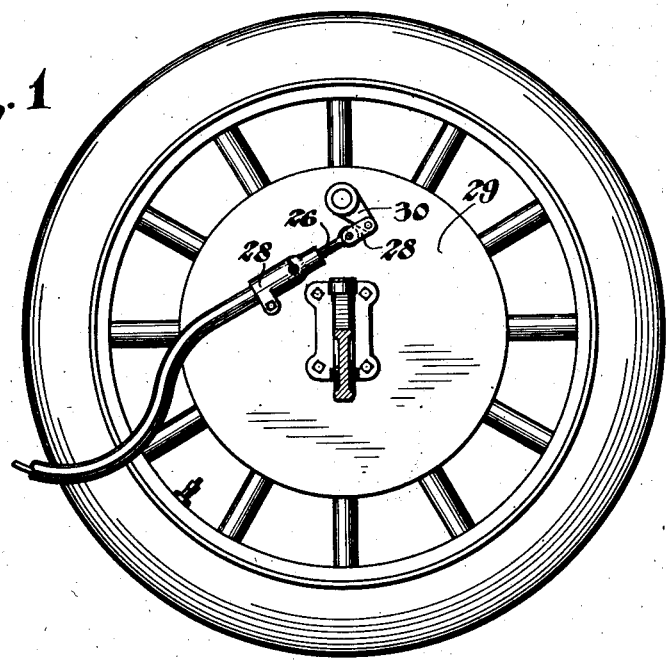
Figure 1 is a view in side elevation of a vehicle wheel and associated brake parts including one form of my invention.

A similar solid end piece or end lug 26 may also be slidingly incorporated within the conduit support fitting 28 mounted on the backing plate or brake support plate 29 as disclosed in Figure 1. The lug 26 is here pivotally secured to a tension connecting link 28, the latter being preferably pivotally secured to one end of a crank 30 operating the cam shaft of the brake.

It has been suggested to flare the outer ends of the conduit fittings to thus permit free lateral movement of the flexible tension element passing through the fitting and out of the flared end on to the service pedal. This construction has the disadvantage that with the release of the service pedal and the functioning of the return spring 31 acting on said pedal the cable in its return movement under the action of said spring is liable to buckle at the flared end of the fitting just described. With my invention, however, the tension element is positively guided in its return movement by the solid lug 22 sliding within the bore in the fitting. A complete return of the tension element is thus insured, which return brings the brake cam into its normal inoperative position.

My invention may be incorporated in other constructions than controls for an automotive brake system, for it might be utilized in any flexible power transmission cable utilizing connected rigid and flexible tension elements.

While but one embodiment of my invention has been described in detail, it is not my intention to limit the scope of the invention to that particular embodiment, or otherwise than by the terms of the appended claim.

I claim:

A control device comprising a cable having a rigid element secured to its end, the rigid element being of larger diameter than the cable, a support having a bore of a diameter to fit the rigid element and into which bore a short section of the cable extends, a flexible conduit housing the cable and engaging the support at its end, and means for introducing lubricant into the annular space about said short section of the cable within the bore of said support whereby the inner end of the rigid element serves as a pump plunger for forcing lubricant into the flexible conduit.

In testimony whereof, I have hereunto signed my name.

ROY SELDEN SANFORD.